United States Patent
Tanabe et al.

(10) Patent No.: US 7,842,642 B2
(45) Date of Patent: Nov. 30, 2010

(54) CATALYST CARRIER AND CATALYST USING THE SAME

(75) Inventors: Toshitaka Tanabe, Aichi (JP); Akira Morikawa, Nagoya (JP); Naoki Takahashi, Nagoya (JP); Hiromasa Suzuki, Toyota (JP); Akemi Sato, Toyota (JP); Mamoru Ishikiriyama, Fujieda (JP); Takaaki Kanazawa, Toyota (JP); Oji Kuno, Toyota (JP)

(73) Assignees: Toyota Jidosha Kabushiki Kaisha, Toyota-shi, Aichi-ken (JP); Kabushiki Kaisha Toyota Chuo Kenkyusho, Aichi-Gun, Aichi (JP)

( * ) Notice: Subject to any disclaimer, the term of this patent is extended or adjusted under 35 U.S.C. 154(b) by 155 days.

(21) Appl. No.: 11/632,945

(22) PCT Filed: Jul. 22, 2005

(86) PCT No.: PCT/JP2005/013892
§ 371 (c)(1),
(2), (4) Date: Jan. 19, 2007

(87) PCT Pub. No.: WO2006/009321
PCT Pub. Date: Jan. 26, 2006

(65) Prior Publication Data
US 2008/0090722 A1    Apr. 17, 2008

(30) Foreign Application Priority Data
Jul. 22, 2004 (JP) .................. P2004-214930

(51) Int. Cl.
*B01J 21/06* (2006.01)
*B01J 23/10* (2006.01)
*B01J 23/46* (2006.01)
*B01J 23/63* (2006.01)

(52) U.S. Cl. ............... 502/303; 502/302; 502/326; 502/349; 502/527.11

(58) Field of Classification Search ......... 502/302–304, 502/326, 349, 327.12
See application file for complete search history.

(56) References Cited

U.S. PATENT DOCUMENTS

| | | | |
|---|---|---|---|
| 4,843,056 A * | 6/1989 | Matsumoto et al. ......... 502/302 |
| 4,923,842 A | 5/1990 | Summers | |
| 6,294,140 B1 | 9/2001 | Mussmann et al. | |
| 2002/0115730 A1* | 8/2002 | Allison et al. ............... 518/703 |
| 2002/0177628 A1 | 11/2002 | | Gaffney et al. |

(Continued)

FOREIGN PATENT DOCUMENTS

| | | |
|---|---|---|
| EP | 0 333 037 | 3/1989 |
| JP | 9-141098 | 6/1997 |

* cited by examiner

*Primary Examiner*—Timothy C Vanoy
*Assistant Examiner*—Diana J Liao
(74) *Attorney, Agent, or Firm*—Finnegan, Henderson, Farabow, Garrett & Dunner, LLP

(57) ABSTRACT

The catalyst carrier in accordance with the present invention is a catalyst carrier comprising a support containing an oxide and an element in group 3A of the periodic table, and a coating part covering at least a part of a surface of the support; wherein the coating part contains an element in group 3A of the periodic table; and wherein the element in group 3A contained in the coating part has a concentration higher than that of the element in group 3A contained in the support. In this case, even when a catalyst in which rhodium is supported by the catalyst carrier is used for a long time in a high temperature environment, the grain growth of rhodium particles can be suppressed, and the catalyst can fully be prevented from lowering its activity.

12 Claims, 4 Drawing Sheets

CATALYST CARRIER AND CATALYST USING THE SAME

TECHNICAL FIELD

The present invention relates to a catalyst carrier and a catalyst using the same, and more specifically to a catalyst carrier and a catalyst in which rhodium as an active site for a catalytic reaction is supported by the catalyst carrier.

BACKGROUND ART

Various catalysts have been developed for eliminating substances harmful to humans and alleviating burdens on environments. In particular, catalysts which efficiently eliminate or detoxify harmful substances such as hydrocarbons (hereinafter referred to as "HC"), carbon monoxide (hereinafter referred to as "CO"), and nitrogen oxides (hereinafter referred to as "NOx"), for example, contained in exhaust gases emitted from internal combustion engines of cars and the like, thereby cleaning the exhaust gases have been developed. Those proposed as such exhaust gas cleaning catalysts include three-way catalysts which simultaneously clean HC, CO, and NOx at a stoichiometric air fuel ratio, thereby detoxifying them, and NOx occlusion and reduction catalysts which occlude NOx onto the catalysts in an oxidizing atmosphere and then reduce the NOx to $N_2$ in a rich atmosphere. Since temperature conditions under which these catalysts are used include a high temperature on the order of 600 to 1100° C., it has been demanded to develop a catalyst whose catalytic activity does not decrease remarkably even when exposed to such a high temperature.

Proposed in response to such a demand are exhaust gas cleaning catalysts which, even when used for a long time in a high temperature environment, suppress the sintering of catalyst carriers and improve the chemical stability of active metal species supported by the catalyst carriers. For example, Japanese Patent Application Laid-Open No. HEI 9-141098 discloses an integral catalyst having the following configuration as an exhaust gas cleaning catalyst having a better durability at a high temperature than that of conventional catalysts and exhibiting excellent low temperature activity and cleaning performance even after being used for a long time at a high temperature.

Namely, the integral catalyst includes a carrier such as cordierite monolith and a catalyst component carrying layer, coated and fired on a carrier surface, supporting rhodium, whereas the catalyst component carrying layer contains a zirconium oxide represented by the general formula of $[X]_a Zr_b O_c$ (where X is at least one species of element selected from the group consisting of magnesium, calcium, strontium, neodymium, yttrium, and lanthanum, whereas a, b, and c are respective atomic ratios of their corresponding elements; when b=1.0, a=0.01 to 0.6, and c is the number of oxygen atoms necessary for satisfying the atomic values of the components mentioned above).

In this integral catalyst, the added X element is completely dissolved as a solid in a crystal structure of the zirconium oxide, whereby the catalyst component carrying layer supporting rhodium particles is a zirconium oxide having a specific composition. Namely, no oxides made of the added elements alone exist in the catalyst component carrying layer supporting rhodium particles, so that inactive compounds are fully prevented from being formed by rhodium and oxides made of the added elements alone, whereas the structural stability improves at a high temperature, whereby a zirconium oxide having a large specific surface area can be obtained.

DISCLOSURE OF THE INVENTION

However, the inventors have found that, when the catalyst disclosed in the above-mentioned Japanese Patent Application Laid-Open No. HEI 9-141098 is used for a long time in a high temperature environment, the particle growth of rhodium particles occurs, thereby failing to fully prevent the catalytic activity from decreasing.

It is an object of the present invention to provide a catalyst carrier which, even when used for a long time in a high temperature environment, can fully suppress the grain growth of rhodium particles supported as an active site for a catalytic reaction and can sufficiently prevent the catalyst from lowering its activity; and a catalyst using the same.

The inventors conducted diligent studies in order to solve the problem mentioned above and, as a result, have found that the above-mentioned problem can be overcome when a catalyst carrier is constituted by a support and a coating part disposed on a surface of the support whereas a specific element exists by a higher concentration in the coating part than in the support, thereby completing the present invention.

Namely, the catalyst carrier in accordance with the present invention is a catalyst carrier comprising a support containing an oxide and an element in group 3A of the periodic table, and a coating part covering at least a part of a surface of the support; wherein the coating part contains an element in group 3A of the periodic table; and wherein the element in group 3A contained in the coating part has a concentration higher than that of the element in group 3A contained in the support.

Even when a catalyst constructed by the catalyst carrier and rhodium particles acting as an active site for a catalytic reaction supported on the catalyst carrier is used for a long time in a high temperature environment, the grain growth of rhodium particles can sufficiently be suppressed, and the activity of the catalyst can fully be prevented from decreasing. Although the reason is not clear, it appears that the activity of the catalyst can be maintained because of the interaction between the element in group 3A contained in the coating part constituting the catalyst carrier and the rhodium particle active site for a catalytic reaction and by the improved heat resistance of the catalyst carrier itself due to the element in group 3A contained in the support.

Preferably, in the catalyst carrier, the element in group 3A contained in the coating part constituting the catalyst carrier is at least one species selected from the group consisting of Nd and La. In this case, even when a catalyst constructed by the catalyst carrier and rhodium supported on the catalyst carrier is used for a long time in a high temperature environment, the grain growth of rhodium particles can be suppressed more fully, and the catalytic activity can more fully be prevented from decreasing. A reason therefor seems to be that these elements exhibit alkalinity when in oxides, thereby generating a bond represented by Rh—O-M (where M is the surface concentrating element) when a rhodium particle which is an active site for a catalytic reaction is supported by the catalyst carrier.

More preferably, in the catalyst carrier, the element in group 3A contained in the coating part is Nd, whereas the Nd element content in the catalyst carrier is 1 to 5 mass % in terms of $Nd_2O_3$. In this case, the grain growth of rhodium is more fully prevented than in the case where the Nd content in terms of $Nd_2O_3$ is out of the above-mentioned range.

Preferably, the element in group 3A contained in the coating part is La, whereas the La element content in the catalyst carrier is 2 to 6.5 mass % in terms of $La_2O_3$. In this case, the grain growth of rhodium is more fully prevented from occurring than in the case where the La element content in terms of $La_2O_3$ is out of the above-mentioned range.

Preferably, the oxide contained in the support in the catalyst carrier is a zirconium oxide. This can further improve the heat resistance of the catalyst, since the zirconium oxide is superior to silicon oxides and titanium oxides from the viewpoint of heat resistance.

The catalyst in accordance with the present invention comprises the above-mentioned catalyst carrier, and a rhodium particle supported on the catalyst carrier, whereas at least a part of the rhodium particle acting as an active site for a catalytic reaction is supported in contact with the coating part constituting the catalyst carrier.

Even when the catalyst of the present invention is used for a long time in a high temperature environment, the grain growth of the rhodium particle can fully be suppressed, and the catalyst can sufficiently be prevented from lowering its activity. Although the reason is not clear, it appears that the activity of the catalyst can be maintained because of the interaction between the element in group 3A contained in the coating part constituting the catalyst carrier and the rhodium particle active site for a catalytic reaction and by the improved heat resistance of the catalyst carrier itself due to the element in group 3A contained in the support.

BEST MODES FOR CARRYING OUT THE INVENTION

Figure 1:
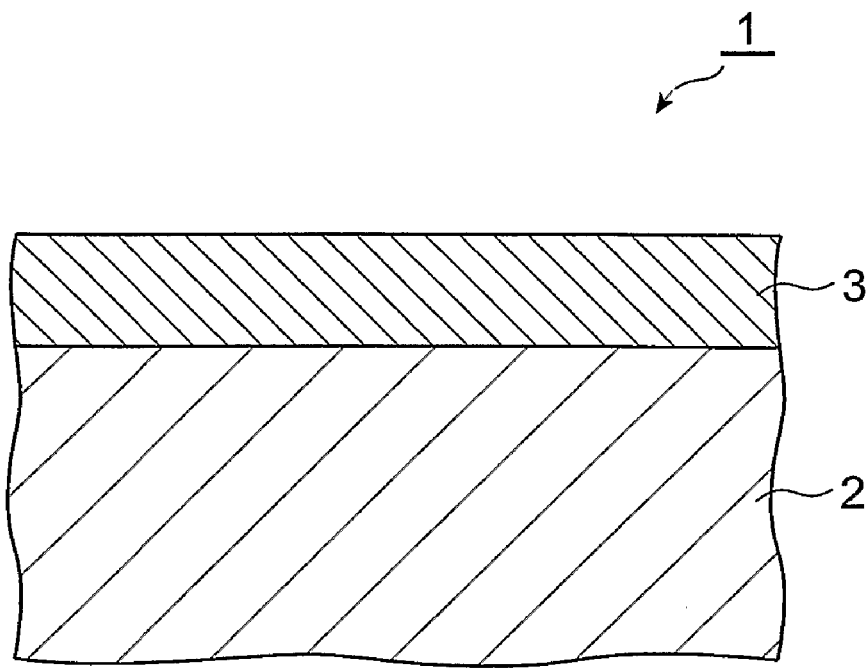
FIG. 1 is a cross sectional view showing an embodiment of the catalyst carrier in accordance with the present invention conceptually.

In the following, the catalyst carrier and catalyst in accordance with the present invention will be explained in detail. First, the catalyst carrier in accordance with the present invention will be explained. FIG. 1 is a cross sectional view showing an embodiment of the catalyst carrier in accordance with the present invention conceptually. As shown in FIG. 1, the catalyst carrier 1 in accordance with the present invention is a catalyst carrier comprising a support 2 containing an oxide and an element in group 3A of the periodic table, and a coating part 3 covering at least a part of a surface of the support 2; wherein the coating part 3 contains an element in group 3A of the periodic table; and wherein the element in group 3A contained in the coating part 3 has a concentration higher than that of the element in group 3A contained in the support 2.

Even when a catalyst constructed by the catalyst carrier 1 and rhodium particles acting as an active site for a catalytic reaction supported on the catalyst carrier 1 is used for a long time in a high temperature environment, the grain growth of rhodium particles can sufficiently be suppressed, and the activity of the catalyst can fully be prevented from decreasing. Although the reason is not clear, it appears that the activity of the catalyst can be maintained because of the interaction between the element in group 3A contained in the coating part 3 constituting the catalyst carrier 1 and the rhodium particle active site for a catalytic reaction and by the improved heat resistance of the catalyst carrier 1 itself due to the element in group 3A contained in the support 2.

The above-mentioned support 2 contains an oxide (which will hereinafter be referred to as "support oxide") and an element in group 3A (which will hereinafter be referred to as "support additional element"). Preferably, for the sake of improving thermal stability, the support 2 is constituted by a crystal particle. In this case, the support 2 may be either a primary particle constituted by a single crystal particle or a secondary particle (aggregate) constructed by a plurality of crystal particles flocculated together.

Examples of the support oxide include zirconium oxides, lanthanum oxides, aluminum oxides, silicon oxides, titanium oxides, magnesium oxides, and neodymium oxides. Preferably, the support oxide contains at least a zirconium oxide as the oxide mentioned above. This can further improve the heat resistance of the catalyst, since the zirconium oxide is superior to silicon oxides and titanium oxides from the viewpoint of heat resistance.

The support oxide may be constituted by either one species of oxide or a plurality of species of oxides. When the support oxide is constituted by a plurality of species of oxides, it will be preferred from the viewpoint of suppressing the grain growth of the support oxide in a high temperature environment if each oxide is at least partly dissolved as a solid.

When the support oxide is constituted by two species of oxides, it will be preferred if the two species of oxides are a zirconium oxide and a lanthanum oxide, respectively. This is advantageous in that lanthanum is dissolved as a solid into the zirconium oxide, so that the crystal phase can be stabilized, and the grain growth can be suppressed.

In this case, the lanthanum oxide content in the support oxide is preferably 1 to 6 mol %.

The support additional element is not restricted in particular as long as it is an element in group 3A. However, from the viewpoint of practical usability, the support additional element is preferably scandium, yttrium, lanthanum, cerium, praseodymium, neodymium, promethium, samarium, europium, gadolinium, terbium, dysprosium, holmium, erbium, thulium, ytterbium, and lutetium which are rare-earth elements, and combinations of two or more species thereof. Among them, yttrium, lanthanum, neodymium, praseodymium, or combinations of two or more species thereof are used more preferably as the support additional element.

The support additional element may be contained in the support in any form as long as it is dispersed in the support 2, but preferably is dissolved as a solid in the support oxide. This can further improve the heat resistance of the support 2 as compared with the case where the support 2 is constituted by a support oxide and an oxide containing a support additional element, i.e., the case where the support additional element is not dissolved as a solid in the support oxide.

Preferably, the support 2 contains the support additional element by 1 to 6 mol % in terms of an oxide. When the support additional element content is less than 1 mol %, the effects of stabilizing crystal phases and suppressing the grain growth tend to become insufficient as compared with the case where the support additional element content is 1 mol % or greater. When the support additional element content exceeds 6 mol %, the specific surface area of the oxide tends to become smaller than that in the case where the content is 6 mol % or less.

The coating part 3 constitutes a catalyst carrier 1 together with the support 2, and contains an element in group 3A. In the catalyst carrier 1, the concentration of the element in group 3A (which will hereinafter be referred to as "surface concentrating element") is higher than that of the element in group 3A (the support additional element) contained in the support 2.

Here, it is not always necessary for the support additional element and the surface concentrating element to be the same. For example, the support additional element and the surface concentrating element may be Nd and La, respectively, or vice versa.

The surface concentrating element usually exists in an oxide state in the coating part 3. The coated part 3 may contain not only one species but two or more species of surface concentrating elements. When there are a plurality of species of surface concentrating elements, it is not always necessary for these elements to be dissolved as solids and form a mixed oxide.

It will be sufficient if the content of the surface concentrating element in the coating part 3 is relatively enhanced with respect to the content of the support additional element in the support, while the coating part 3 and the support 2 do not always form a clear boundary. Though the coating part 3 is formed so as to cover the surface of the support 2 while having a certain extent of depth, it is not always necessary for the coating part 3 to cover the whole surface of the support 2, and will be sufficient if at least a part of the support surface is covered therewith.

The surface concentrating element is not restricted in particular as long as it is an element belonging to group 3A. However, from the viewpoint of practical usability, the surface concentrating element is preferably scandium, yttrium, lanthanum, cerium, praseodymium, neodymium, promethium, samarium, europium, gadolinium, terbium, dysprosium, holmium, erbium, thulium, ytterbium, and lutetium which are rare-earth elements, or a combination of two or more species thereof. Among them, at least one species selected from the group consisting of Nd and La is more preferable. In this case, even when a catalyst constructed by the catalyst carrier 1 and rhodium supported on the catalyst carrier 1 is used for a long time in a high temperature environment, the grain growth of rhodium particles can be suppressed more fully, and the catalytic activity can more fully be prevented from decreasing. A reason therefor seems to be that these elements exhibit alkalinity when in oxides, so as to generate a bond represented by Rh—O-M (where M is the surface concentrating element) when a rhodium particle which is an active site for a catalytic reaction is supported by the catalyst carrier 1, thereby restricting the migration of rhodium oxide particles on the catalyst carrier surface.

When the surface concentrating element appropriately exists within a certain range in the catalyst carrier surface, the bond represented by Rh—O-M (where M is the surface concentrating element) is cleaved more fully in a reducing atmosphere, so that rhodium metal which is an active species for a catalytic reaction is reproduced fully, whereby a sufficient catalytic activity is exhibited.

Specifically, when the surface concentrating element is constituted by Nd alone, the Nd content in the catalyst carrier is preferably 1 to 5 mass %, more preferably 1 to 3 mass % in terms of $Nd_2O_3$. When the addition of $Nd_2O_3$, i.e., the content of Nd element in the catalyst carrier 1, is less than 1 mass %, the Rh—O-M bond is less likely to be formed sufficiently during a long time of use in an environment including a high-temperature oxidizing atmosphere, so that rhodium oxide tends to grow its grains, as compared with the case where the content is 1 mass % or more. When the content exceeds 5 mass %, the Rh—O-M bond formed thereby tends to become firmer and fail to cleave sufficiently in a reducing atmosphere, whereby rhodium metal as an active species is less likely to be reproduced as compared with the case where the content is 5 mass % or less. When the surface concentrating element is constituted by La alone, the content of La element in the catalyst carrier 1 is preferably 2 to 6.5 mass %, more preferably 3 to 5.5 mass % in terms of $La_2O_3$. When the addition of $La_2O_3$, i.e., the content of La element in the catalyst carrier 1, is less than 2 mass %, the Rh—O-M bond is less likely to be formed sufficiently during a long time of use in an environment including a high temperature oxidizing atmosphere, so that rhodium oxide tends to grow its grains, as compared with the case where the content is 2 mass % or more. When the content exceeds 6.5 mass %, the Rh—O-M bond formed thereby tends to become firmer and fail to cleave sufficiently in a reducing atmosphere, whereby rhodium metal as an active species is less likely to be reproduced as compared with the case where the content is 6.5 mass % or less.

The fact that the surface concentrating element in the coating part 3 exists by a higher concentration than the support additional element concentration in the support 2 can be verified, for example, by analyzing the composition by EDX (energy dispersive x-ray detector), SIM (secondary ion mass spectrometer), or the like, and comparing the respective content ratios of the surface concentrating element in a surface layer part of the catalyst carrier 1 and the support additional element in a center part.

The catalyst of the present invention will now be explained.

Figure 2:
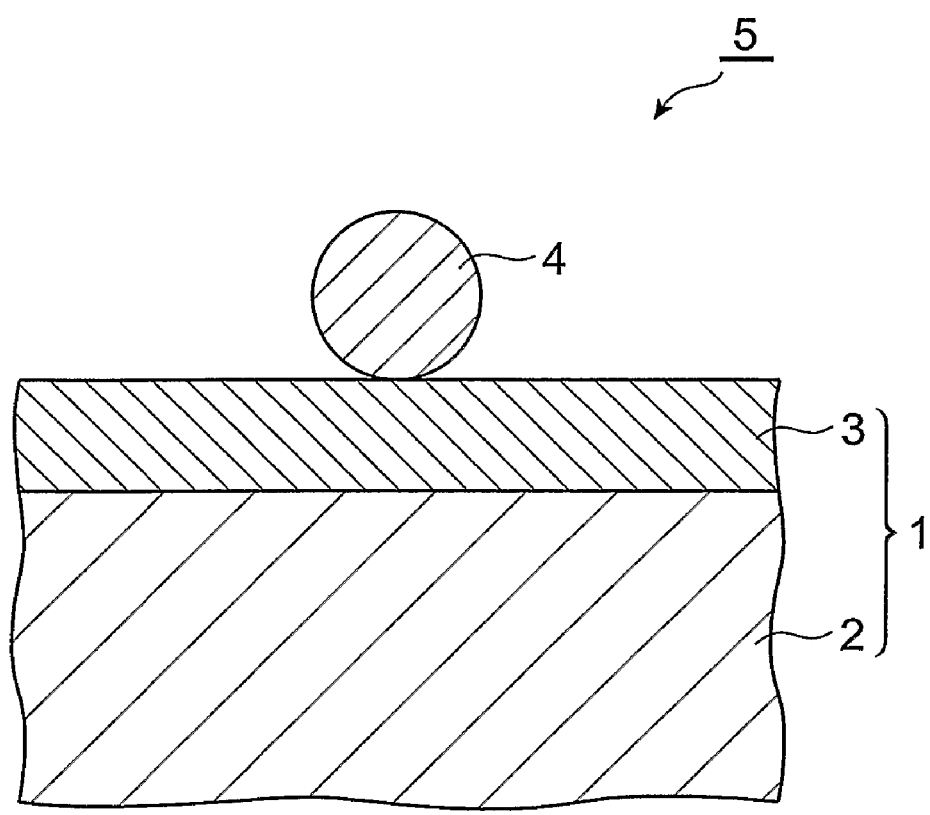
FIG. 2 is a cross sectional view showing an embodiment of the catalyst in accordance with the present invention conceptually.

FIG. 2 is a cross sectional view showing an embodiment of the catalyst in accordance with the present invention conceptually. As shown in FIG. 2, the catalyst 5 in accordance with the present invention comprises the catalyst carrier 1 explained in the foregoing, and a rhodium particle 4 supported on the catalyst carrier 1, whereas at least a part of the rhodium particle 4 acting as an active site for a catalytic reaction is supported in contact with the coating part 3 constituting the catalyst carrier 1.

Even when the catalyst 5 of the present invention is used for a long time in a high temperature environment, the grain growth of the rhodium particle 4 can fully be suppressed, and the catalyst 5 can sufficiently be prevented from lowering its activity.

Though not clarified, a reason therefor seems to be that the surface concentrating element and the rhodium particle acting as an active site for a catalytic reaction interact with each other by way of a bond expressed by the above-mentioned Rh—O-M (where M is the surface concentrating element) even when the catalyst 5 is used for a long time in a high temperature oxidizing atmosphere, so that the migration of rhodium oxide particles on the catalyst carrier surface is restricted, whereby the grain growth due to collisions and coalescences of rhodium oxide particles is fully prevented from occurring.

Another reason seems be that the support additional element acts to increase the specific surface area of the support 2 and improve the structural stability of the support 2 in a high temperature environment, so that the specific surface area is restrained from decreasing because of the sintering of the catalyst carrier 1 even when the catalyst 5 is used for a long time in the high temperature environment, which sufficiently prevents rhodium particles 4 supported on the catalyst carrier 1 from reducing distances therebetween, whereby the grain growth due to collisions and coalescences of rhodium particles 4 is fully prevented from occurring.

For exhibiting a sufficiently high catalytic activity, the amount of rhodium supported on the catalyst carrier 1 is preferably 0.01 to 3 parts by mass, more preferably 0.05 to 2 parts by mass, particularly preferably 0.1 to 1 part by mass with respect to 100 parts by mass of the catalyst carrier 1. A sufficient activity is less likely to be exhibited when the amount is less than 0.01 part by mass as compared with the case that the amount of rhodium is 0.01 part or greater by mass, whereas the activity tends to be saturated when the amount exceeds 3 parts by mass.

The dispersibility of rhodium particles 4 supported by the catalyst carrier 1 can be measured by a conventionally known CO or $H_2$ pulse test or the like. The dispersibility of rhodium particles 4 becomes an index for evaluating the extent of the grain growth of rhodium particles 4 on the catalyst carrier 1. The grain growth of rhodium is suppressed more as the dispersibility is higher, and less as the latter is lower.

The mode for using the catalyst 5 is not restricted in particular. For example, a layer made of the catalyst 5 in accordance with the present invention can be formed on a surface of a base such as a monolith base in a honeycomb form, a pellet base, or a foam base, and thus obtained product can be used while being disposed in an exhaust flow path of an internal combustion engine or the like.

A method of manufacturing the catalyst 5 in accordance with the present invention will now be explained.

First, a coating part 3 is formed on a surface of a support 2, so as to yield a catalyst carrier 1. Here, the support 2 can be obtained by coprecipitation, sedimentation, dipping, mechanochemical method, sol-gel method, hydrothermal method, or the like. In this step, a surface concentrating element is attached to a support 2 obtained by a support manufacturing process such as coprecipitation, and the resulting product is fired, whereby a particulate catalyst carrier 1 is attained. The surface concentrating element can be attached to the support surface by a method of impregnating the support powder with an aqueous nitrate solution containing the surface concentrating element, or the like.

When a precursor of a catalyst carrier 1 obtained by attaching the surface concentrating element to the support surface is attained in the process of yielding the catalyst carrier 1 by forming the support surface with the coating part 3 in the above-mentioned step, the firing temperature of the precursor for the catalyst carrier 1 is preferably 500 to 900° C., whereas the firing is preferably performed for 0.5 to 10 hours in an oxidizing atmosphere such as air.

Then, the catalyst carrier 1 is caused to support rhodium particles 4 which are active metal particles having a catalytic activity such as oxidation activity or reduction activity, whereby the above-mentioned catalyst 5 is obtained. Conventionally known methods such as dipping can be employed for causing the catalyst carrier 1 to support rhodium.

EXAMPLES

In the following, the present invention will be explained more specifically with reference to examples and comparative examples. However, the present invention will not be restricted by the following examples.

Example 1

An oxide, made of $ZrO_2$ and $La_2O_3$, containing 3 mol % of $La_2O_3$ was impregnated with an aqueous neodymium nitrate solution such that, with respect to 10 g of the oxide, the neodymium content in the neodymium-added oxide in terms of an oxide ($Nd_2O_3$) thereof was 2 mass %, and the solvent was evaporated, so as to add neodymium to the oxide surface, thereby yielding a powder. Thus obtained powder was heat-treated at a heat-treatment temperature of 700° C. Thus, a catalyst carrier having a coating part on the support surface was obtained. Here, this catalyst carrier was subjected to an EDX analysis, so as to determine a concentration distribution along the depth direction of the catalyst carrier from the surface thereof. As a result, the concentration of neodymium element in the surface of the catalyst carrier was seen to be higher than that at a location distanced from the surface. Subsequently, thus obtained catalyst carrier was caused to support rhodium by using an aqueous rhodium nitrate solution such that the supported amount of rhodium became 0.67 mass %, and then was fired in air at 500° C., whereby a catalytic powder in which rhodium particles were supported by the catalyst carrier was obtained.

Example 2

A catalyst carrier was obtained as in Example 1 except that the oxide was impregnated with the aqueous neodymium nitrate solution such that the neodymium content in the neodymium-added oxide was 10 mass % in terms of the oxide ($Nd_2O_3$). The concentration distribution along the depth direction of the catalyst carrier from the surface thereof was determined as in Example 1. As a result, the concentration of neodymium element in the surface of the catalyst carrier was seen to be higher than that at a location distanced from the surface. As in Example 1, the catalyst carrier was caused to support rhodium, whereby a catalytic powder was obtained.

Example 3

A catalyst carrier was obtained as in Example 1 except that the heat-treatment temperature was 900° C. The concentration distribution along the depth direction of the catalyst carrier from the surface thereof was determined as in Example 1. As a result, the concentration of neodymium element in the surface of the catalyst carrier was seen to be higher than that at a location distanced from the surface. As in Example 1, the catalyst carrier was caused to support rhodium, whereby a catalytic powder was obtained.

Example 4

A catalyst carrier was obtained as in Example 1 except that the oxide was impregnated with the aqueous neodymium nitrate solution such that the neodymium content in the neodymium-added oxide was 5 mass % in terms of the oxide ($Nd_2O_3$), and that the heat-treatment temperature was 900° C. The concentration distribution along the depth direction of the catalyst carrier from the surface thereof was determined as in Example 1. As a result, the concentration of neodymium element in the surface of the catalyst carrier was seen to be higher than that at a location distanced from the surface. As in Example 1, the catalyst carrier was caused to support rhodium, whereby a catalytic powder was obtained.

Example 5

A catalyst carrier was obtained as in Example 1 except that the oxide was impregnated with the aqueous neodymium nitrate solution such that the neodymium content in the neodymium-added oxide was 10 mass % in terms of the oxide ($Nd_2O_3$), and that the heat-treatment temperature was 900° C.

The concentration distribution along the depth direction of the catalyst carrier from the surface thereof was determined as in Example 1. As a result, the concentration of neodymium element in the surface of the catalyst carrier was seen to be higher than that at a location distanced from the surface. As in Example 1, the catalyst carrier was caused to support rhodium, whereby a catalytic powder was obtained.

Example 6

An oxide, made of $ZrO_2$ and $La_2O_3$, containing 3 mol % of $La_2O_3$ was impregnated with an aqueous lanthanum nitrate solution such that, with respect to 10 g of the oxide, the lanthanum content in the lanthanum-added oxide in terms of an oxide ($La_2O_3$) thereof was 2 mass %, and the solvent was evaporated, so as to add lanthanum to the oxide surface, thereby yielding a powder. Thus obtained powder was heat-treated at a heat-treatment temperature of 500° C. Thus, a catalyst carrier having a coating part on the support surface was obtained. Here, the concentration distribution along the depth direction of the catalyst carrier from the surface thereof was determined as in Example 1. As a result, the concentration of lanthanum element in the surface of the catalyst carrier was seen to be higher than that at a location distanced from the surface. As in Example 1, the catalyst carrier was caused to support rhodium, whereby a catalytic powder was obtained.

Example 7

A catalyst carrier was obtained as in Example 6 except that the oxide was impregnated with the aqueous lanthanum nitrate solution such that the lanthanum content in the lanthanum-added oxide was 5 mass % in terms of the oxide. The concentration distribution along the depth direction of the catalyst carrier from the surface thereof was determined as in Example 1. As a result, the concentration of lanthanum element in the surface of the catalyst carrier was seen to be higher than that at a location distanced from the surface. As in Example 1, the catalyst carrier was caused to support rhodium, whereby a catalytic powder was obtained.

Example 8

A catalyst carrier was obtained as in Example 6 except that the oxide was impregnated with the aqueous lanthanum nitrate solution such that the lanthanum content in the lanthanum-added oxide was 10 mass % in terms of the oxide, and that the heat-treatment temperature was 700° C. The concentration distribution along the depth direction of the catalyst carrier from the surface thereof was determined as in Example 1. As a result, the concentration of lanthanum element in the surface of the catalyst carrier was seen to be higher than that at a location distanced from the surface. As in Example 1, the catalyst carrier was caused to support rhodium, whereby a catalytic powder was obtained.

Example 9

A catalyst carrier was obtained as in Example 6 except that the heat-treatment temperature was 900° C. The concentration distribution along the depth direction of the catalyst carrier from the surface thereof was determined as in Example 1. As a result, the concentration of lanthanum element in the surface of the catalyst carrier was seen to be higher than that at a location distanced from the surface. As in Example 1, the catalyst carrier was caused to support rhodium, whereby a catalytic powder was obtained.

Example 10

A catalyst carrier was obtained as in Example 6 except that the oxide was impregnated with the aqueous lanthanum nitrate solution such that the lanthanum content in the lanthanum-added oxide was 5 mass % in terms of the oxide, and that the heat-treatment temperature was 900° C. The concentration distribution along the depth direction of the catalyst carrier from the surface thereof was determined as in Example 1. As a result, the concentration of lanthanum element in the surface of the catalyst carrier was seen to be higher than that at a location distanced from the surface. As in Example 1, the catalyst carrier was caused to support rhodium, whereby a catalytic powder was obtained.

Example 11

A catalyst carrier was obtained as in Example 6 except that the oxide was impregnated with the aqueous lanthanum nitrate solution such that the lanthanum content in the lanthanum-added oxide was 10 mass % in terms of the oxide, and that the heat-treatment temperature was 900° C. The concentration distribution along the depth direction of the catalyst carrier from the surface thereof was determined as in Example 1. As a result, the concentration of lanthanum element in the surface of the catalyst carrier was seen to be higher than that at a location distanced from the surface. As in Example 1, the catalyst carrier was caused to support rhodium, whereby a catalytic powder was obtained.

Comparative Example 1

A catalyst carrier was obtained as in Example 1 except that 10 g of the oxide, made of $ZrO_2$ and $La_2O_3$, containing 3 mol % of $La_2O_3$ were not impregnated with an aqueous neodymium nitrate solution, and that the oxide was not heat-treated. The concentration distribution along the depth direction of the catalyst carrier from the surface thereof was determined as in Example 1. As a result, lanthanum element was seen to exist substantially uniformly throughout the carrier. As in Example 1, the catalyst carrier was caused to support rhodium, whereby a catalytic powder was obtained.

Catalyst Durability (Heat Resistance) Test

The catalytic powders obtained by Examples 1 to 11 and Comparative Example 1 were compacted, so as to yield respective pellet-shaped catalysts. Each pellet-shaped catalyst was subjected to a durability test in the following manner. Namely, the durability test was effected by subjecting the pellet-shaped catalyst to heat treatment at 1000° C. for 5 hours while a gas containing 2% CO, 10% $CO_2$, 3% $H_2O$, and 85% nitrogen gases and a gas containing 1% $O_2$, 10% $CO_2$, 3% $H_2O$, and 86% nitrogen gases were alternately caused to circulate at intervals of 5 minutes at a space velocity of 10000/hr.

Rhodium Dispersibility Measurement

For the catalysts collected after the durability test, the rhodium dispersibility was measured by CO pulse absorption method.

Namely, each catalyst subjected to the durability test was treated at 400° C. under the circulation of oxygen and hydrogen gases, and a gas containing CO was introduced as pulses to thus treated catalyst. Then, the CO concentration in the output gas was measured, whereby the amount of CO absorbed to rhodium particles in the catalyst was quantitatively determined. The amount of rhodium exposed at the surface on the catalyst carrier was quantitatively determined from the amount of absorbed CO, and the dispersibility of rhodium particles was determined from the ratio to the whole amount of rhodium supported in the catalyst.

Surface Concentrating Amount Measurement

Each of the catalytic powders obtained by Examples 1 to 11 was added by 0.1 g to 10 ml of $HNO_3$ solution having a concentration of 1 N. The resulting mixture was stirred for 2 hours, so as to dissolve the surface concentrating element into the solution, and then the powder was filtered out. The respective Nd element concentrations in the filtrates for the catalytic powders of Examples 1 to 5, and the respective La element concentrations in the filtrates for the catalytic powders of Examples 6 to 11 were determined in terms of their oxides. The respective amounts by which Nd and La elements which were surface concentrating elements exist in the coating parts were quantitatively determined in terms of $Nd_2O_3$ and $La_2O_3$, and were defined as surface concentrating amounts. The Nd and La element concentrations (in terms of $Nd_2O_3$ and $La_2O_3$) in the filtrates were measured by using an ICP emission spectrophotometer.

Figure 3:
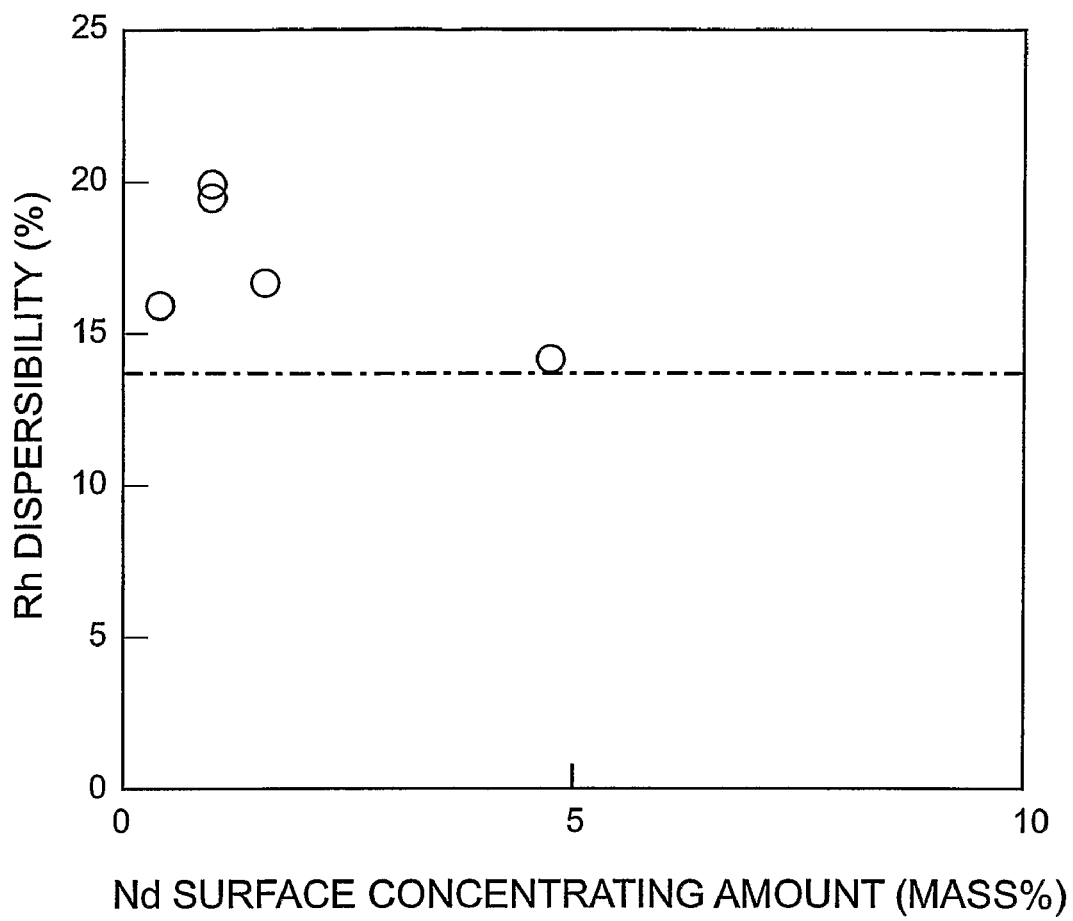
FIG. 3 is a graph showing measurement results concerning Examples 1 to 5 in which the surface concentrating element is Nd element.
Figure 4:
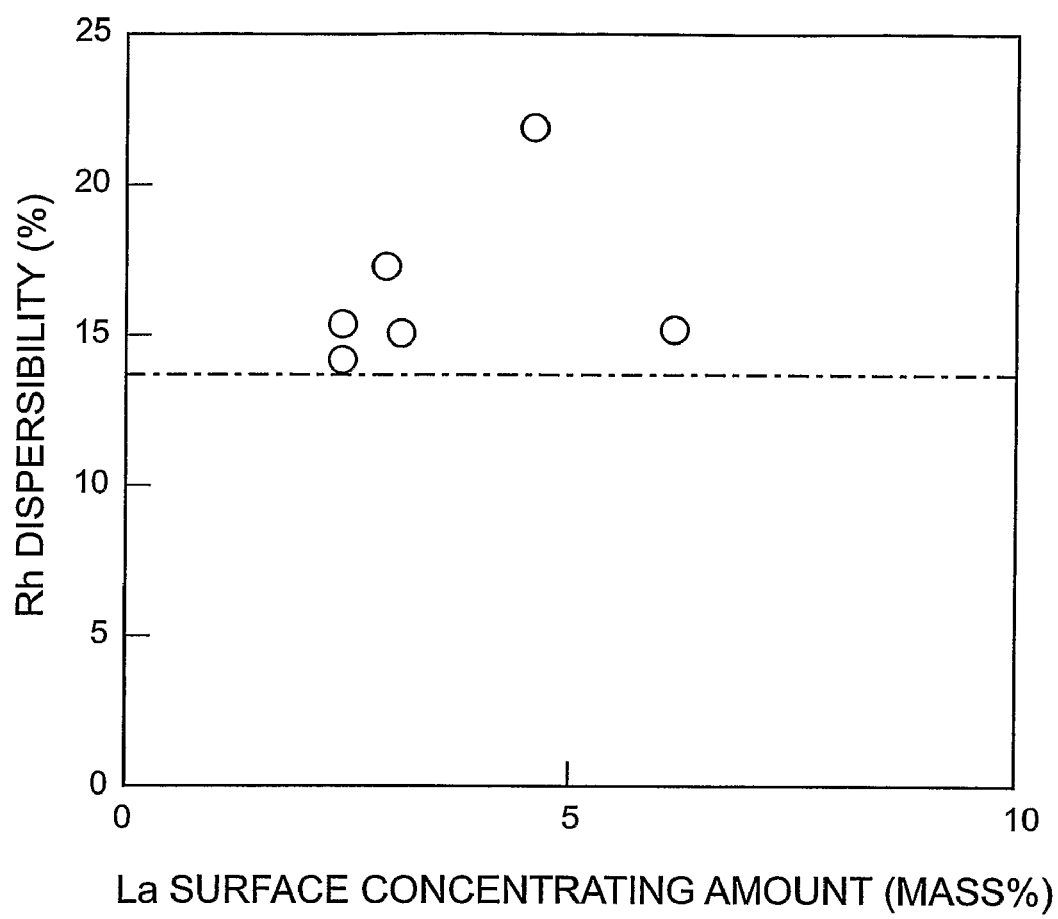
FIG. 4 is a graph showing measurement results concerning Examples 6 to 11 in which the surface concentrating element is La element.

Table 1 and FIGS. 1 and 2 show rhodium dispersibility measurement results and surface concentrating amount measurement results of the catalysts obtained by Examples 1 to 11 and Comparative Example 1. FIGS. 1 and 2 show relationships between the surface concentrating amount and the rhodium dispersibility after the durability test. FIG. 3, whose abscissa axis and ordinate axis indicate the Nd surface concentrating amount (wt %) and the rhodium dispersibility (%), respectively, shows the measurement results for Examples 1 to 5 in which the surface concentrating element is Nd element. FIG. 4, whose abscissa axis and ordinate axis indicate the La surface concentrating amount (wt %) and the rhodium dispersibility (%), respectively, shows the measurement results for Examples 6 to 11 in which the surface concentrating element is La element. The broken lines in the graphs show the rhodium dispersibility in the catalyst obtained by Comparative Example 1, i.e., the rhodium dispersibility of the catalyst having no coating part.

ibility becomes higher even after the catalyst is left at a high temperature for a long time, so that the grain growth of rhodium can fully be suppressed. Therefore, the catalyst of the present invention seems to be also capable of sufficiently preventing the catalytic activity from lowering even when used for a long time in a high temperature environment.

INDUSTRIAL APPLICABILITY

As explained in the foregoing, even when used for a long time in a high temperature environment, the catalyst carrier and catalyst in accordance with the present invention can fully suppress the grain growth of rhodium particles acting as an active site for a catalytic reaction, and can sufficiently prevent the catalyst from lowering its activity.

The invention claimed is:

1. A catalyst comprising:
a catalyst carrier, said catalyst carrier comprising a crystal particle containing an oxide and an element in group 3A of the periodic table, and a coating part covering an upper surface of the crystal particle; and
a catalytic material;
wherein the coating part contains an element in group 3A of the periodic table;
wherein the element in group 3A contained in the coating part has a concentration higher than that of the element in group 3A contained in the crystal particle;
wherein the catalytic material is in contact with an upper exterior surface of the coating part; and
wherein the crystal particle contains a zirconium oxide and a lanthanum oxide.

2. A catalyst according to claim 1, wherein the element in group 3A contained in the coating part is at least one species selected from the group consisting of Nd and La.

3. A catalyst according to claim 1, wherein the element in group 3A contained in the coating part is Nd; and wherein the Nd element content in the catalyst carrier is 1 to 5 mass % in terms of $Nd_2O_3$.

TABLE 1

| | SUPPORT ADDITIONAL ELEMENT AND SURFACE CONCENTRATING ELEMENT | ADDED AMOUNT (MASS %) | HEAT-TREATMENT TEMPERATURE (° C.) | SURFACE CONCENTRATING AMOUNT (MASS %) | Rh DISPERSIBILITY (%) |
|---|---|---|---|---|---|
| EXAMPLE 1 | Nd | 2 | 700 | 1.00 | 19.9 |
| EXAMPLE 2 | Nd | 10 | 700 | 4.95 | 14.2 |
| EXAMPLE 3 | Nd | 2 | 900 | 0.44 | 15.9 |
| EXAMPLE 4 | Nd | 5 | 900 | 1.00 | 19.5 |
| EXAMPLE 5 | Nd | 10 | 900 | 1.60 | 16.6 |
| EXAMPLE 6 | La | 2 | 500 | 2.45 | 14.2 |
| EXAMPLE 7 | La | 5 | 500 | 4.68 | 21.5 |
| EXAMPLE 8 | La | 10 | 700 | 6.24 | 15.3 |
| EXAMPLE 9 | La | 2 | 900 | 2.45 | 15.4 |
| EXAMPLE 10 | La | 5 | 900 | 2.909 | 17.3 |
| EXAMPLE 11 | La | 10 | 900 | 3.12 | 15.1 |
| COMPARATIVE EXAMPLE 1 | NONE | NONE | NONE | NONE | 13.8 |

As shown in Table 1 and FIGS. 1 and 2, the rhodium dispersibility has been seen to improve in the catalysts of Examples 1 to 11 as compared with the catalyst of Comparative Example 1 in which the catalyst carrier ias constituted by the support alone without the coating part. This has shown that, when the Nd or La element concentration in the coating part is higher than that at a deeper location, the Rh dispers- 4. A catalyst according to claim 1, wherein the element in group 3A contained in the coating part is La; and wherein the La element content in the catalyst carrier is 2 to 6.5 mass % in terms of $La_2O_3$.

5. A catalyst according to claim 1, wherein the element contained in the crystal particle is dissolved as a solid in the oxide contained in the crystal particle.

6. A catalyst according to claim 1, wherein the crystal particle contains 1 to 6 mol % of the element in terms of an oxide thereof.

7. A catalyst according to claim 2, wherein the element in group 3A contained in the coating part is Nd; and wherein the Nd element content in the catalyst carrier is 1 to 5 mass % in terms of $Nd_2O_3$.

8. A catalyst according to claim 2, wherein the element in group 3A contained in the coating part is La; and wherein the La element content in the catalyst carrier is 2 to 6.5 mass % in terms of $La_2O_3$.

9. A catalyst according to claim 2, wherein the element contained in the crystal particle is dissolved as a solid in the oxide contained in the crystal particle.

10. A catalyst according to claim 2, wherein the crystal particle contains 1 to 6 mol °A) of the element in terms of an oxide thereof.

11. A catalyst according to claim 1, wherein the catalytic material comprises rhodium.

12. A catalyst according to claim 11, wherein the amount of rhodium is 0.01 to 3 parts by mass with respect to 100 parts by mass of the catalyst carrier.

* * * * *